United States Patent [19]

Caples et al.

[11] 4,253,067
[45] Feb. 24, 1981

[54] BASEBAND DIFFERENTIALLY PHASE ENCODED RADIO SIGNAL DETECTOR

[75] Inventors: Edgar L. Caples, Dallas; Robert K. Marston, Plano; Khalil E. Massad, Garland, all of Tex.

[73] Assignee: Rockwell International Corporation, El Segundo, Calif.

[21] Appl. No.: 968,069

[22] Filed: Dec. 11, 1978

[51] Int. Cl.³ .............................................. H04L 27/22
[52] U.S. Cl. .................................... 329/110; 375/80; 375/84; 455/214
[58] Field of Search ............... 329/110, 117, 119, 122, 329/124, 50; 325/320, 344, 345, 346, 349; 455/214, 337; 375/80, 83–87

[56] References Cited

U.S. PATENT DOCUMENTS

| 3,660,764 | 5/1972 | Goell ................................. 325/320 |
| 3,697,881 | 10/1972 | Nakagome et al. ............ 329/110 X |
| 3,993,956 | 11/1976 | Gilmore et al. ................... 325/320 |
| 4,100,499 | 7/1978 | Monrolin ............................. 329/50 |

OTHER PUBLICATIONS

Taub et al., "Principles of Communication Systems", McGraw-Hill, 1971, pp. 224–227, 383–385.
Simpson et al., "Fundamentals of Analog & Digital Communication Systems", Allyn & Bacon, 1971, pp. 317–321, 350–355.
Electronic Design, vol. 23, No. 26, Dec. 20, 1975, p. 16, "Speed of CCD Memory is Boosted Tenfold".
Amelio, "Physics and Applications of Charge-Coupled Devices", IEEE International Convention & Exposition, vol. VI, New York, Mar. 1973.
Reible et al., "Convolvers for DPSK Demodulation of Spread Spectrum Signals", IEEE Proceedings of the 1976 Sonics and Ultrasonics Symposium, pp. 451–455.
Kosonocky et al., "Basic Concepts of Charge-Coupled Devices", RCA Review, vol. 36, Sep. 1975, pp. 566–593.

Primary Examiner—Siegfried H. Grimm
Attorney, Agent, or Firm—Richard K. Robinson; Howard R. Greenberg; H. Fredrick Hamann

[57] ABSTRACT

A radio signal is applied to an in phase detector channel and a quadrature phase detector channel. Each detector channel includes, in cascade arrangement; an in phase downconverter means for downconverting the received radio signal to a baseband signal; a sampling means for sampling the baseband signal at a predetermined rate; and a matched filter means matched to the symbol waveform and wherein the sample pulses are stored over a predetermined period of time that corresponds to two data symbols. The sum of the pulses for the first data symbol and the sum of the pulses for the second data symbol are compared to determine if there has been a phase reversal between the two data symbols. The outputs of the in phase and quadrature phase channels are summed, which results in demodulation of the encoded data.

18 Claims, 17 Drawing Figures

BASEBAND DIFFERENTIALLY PHASE ENCODED RADIO SIGNAL DETECTOR

BACKGROUND OF THE INVENTION

The invention relates to detectors for detecting differentially phase encoded radio signals.

In general, a differentially phase modulation signal detector includes a phase detector that is capable of measuring the relative phase shift between two adjacent phase-modulated symbols. This is usually performed by applying the received radio signal to a narrow band filter, after which the signal is applied to two channels, a phase detector channel and a delay channel. The phase detector channel compares the phase of a received symbol with the phase of a previously received symbol to determine the phase relationship between the two symbols. The delay channel delays a received data symbol for one data symbol period after which the prorogated symbol is applied to the phase detector for comparison with a subsequent received symbol. Based upon the information of the phase detector, a decision circuit decides, usually in the presence of noise, that a logic zero was transmitted if there is a phase shift magnitude of less than 90° between the data symbols or a logic one was transmitted if there was a phase shift magnitude of greater than 90°. A description of the operation of phase modulation signal detectors such as DPSK detectors is provided in "Fundamentals of Analog & Digital Communication Systems", B. Simpson and R. Houts, Allyn & Bacon, Publishers, 1971, Section 6(a) and in "Principles of Communication Systems", *Electronic & Electronic Engineering Series,* H. Taub and D. Schilling, McGraw-Hill, 1971, pages 224 through 227.

In the case where each bit or data symbol is encoded with a changing or a pseudo-randomly changing spread spectrum chip sequence that results in a different chip code sequence for each bit or symbol, then detecting of the data becomes very difficult using the phase modulation detection technique described above.

Differentially noncoherent phase shift keying, as well as other differentially phase encoded waveforms can be detected by utilizing sample data techniques. Differentially modulation signal detectors have been built for detecting spread spectrum signals using matched filter correlators such as Surface Acoustic Wave devices (SAWD's), Fast Fourier Transform (FFT) processors, and Inductive Capacitive (IC) matched filters. However, there are many trade-offs associated with the above devices when used in the detection of differentially encoded waveforms at baseband. Recent developments (as disclosed in "Speed of CCD Memory is Boosted Tenfold", *Electronic Design,* Vol. 23, No. 26, Dec. 20, 1975, page 16) in the technology of Charge Transfer Devices (CTD) indicate that the transfer rate of CTD's is sufficiently high enough to be used for baseband detection of signals.

There was disclosed in "Principles of Communications Systems", *Electronic & Electronic Engineering Series,* H. Taub & Schilling, 1971, McGraw-Hill, pages 383 through 385 a common realization of a noncoherent matched filter or noncoherent digital matched filter that was used in conjunction with low pass quadrature techniques and which was matched to a signal. The article focused on the special case of binary signals (one bit digitalizations) and a low pass realization of signals using low pass quadrature techniques.

The use of surface acoustic wave devices as convolvers for DPSK demodulation of spread spectrum signals is covered in an article by S. A. Reible, et al. published in *IEEE Proceedings of the* 1976 *Sonics & Ultrasonics Symposium,* entitled "Convolvers for DPSK Demodulation of Spread Spectrum Signals" which provides details on the design and performance of an acoustical electric convolver developed for decoding differential phase shift keyed data at 100 KBits/second rate. The data is encoded on 100 M chips/second pseudo-noise spread spectrum carrier. A 20 microsecond convolver, segmented at its center, acts as an electronically programmable matched filter, providing simultaneous correlated spikes for two adjacent 10 microsecond bit waveforms. Subsequent comparison using a sum and difference hybrid and an envelope detector allows for a decision as to the presence of a phase reversal between two data bits.

SUMMARY OF THE INVENTION

A differentially encoded radio signal is a radio signal that is encoded by the adjustment of the phase between the transmitted symbols and, as disclosed herein, this type of radio signal can be detected by sampled data techniques. Each transmitted symbol of the differentially encoded radio signal has a chip code sequence which can be pseudo-randomly changing. Each chip code sequence may be modulated by any of the known modulation techniques such as phase modulation, frequency modulation, amplitude modulation or any combination or modification thereof. The radio signal, for detection purposes, is applied to an inphase detector channel and a quadrature phase detector channel. Each detector channel includes, in cascade arrangement: an inphase downconverter means for downconverting the received radio signal to a baseband signal; a sampling means for sampling the baseband signal at a predetermined rate; and a matched filter means matched to the symbol waveform and wherein, the sample pulses are stored over a predetermined period of time that corresponds to two data symbols. The sum of the pulses for the first data symbol and the sum of the pulses for the second data symbol are compared to determine if there has been a phase reversal between the two data symbols. The outputs of the inphase quadrature phase channels are summed, the result of which is the demodulated encoded data.

Disclosed is an embodiment of a specific receiver that is designed to receive a differentially encoded radio signal having a minimum shift keyed (MSK) modulated chip code sequence. Downconverting of the received radio signal to a baseband signal includes a mixer means for quadrature mixing the radio signal represented by the equation $$Y(t) = C_I \cos\left(\frac{\pi T}{2T_c}\right) \cos(\omega_o t) + C_Q \sin\left(\frac{\pi T}{2T_c}\right) \sin \omega_o t$$

with a local oscillator signal which can be represented by the equation $x(t) = \cos(\omega_o t + \omega_u t + \theta)$ for the inphase channel and $z(t) = \sin(\omega_o t + \omega_u t + \theta)$ for the quadrature phase channel. The output of each mixer is then passed through a low pass filter, the output of which provides the baseband signal.

There are disclosed several unique implementations of the matched filter means that, in each case, utilize the above-enumerated advantages of charge transfer devices.

Many embodiments of differentially encoded radio signal receivers for both coherent and noncoherent signals are disclosed as well as other objects and advantages of the invention that will be evident from the specification and appended claims in conjunction with the drawings described below.

DETAILED DESCRIPTION OF THE INVENTION

Figure 1:
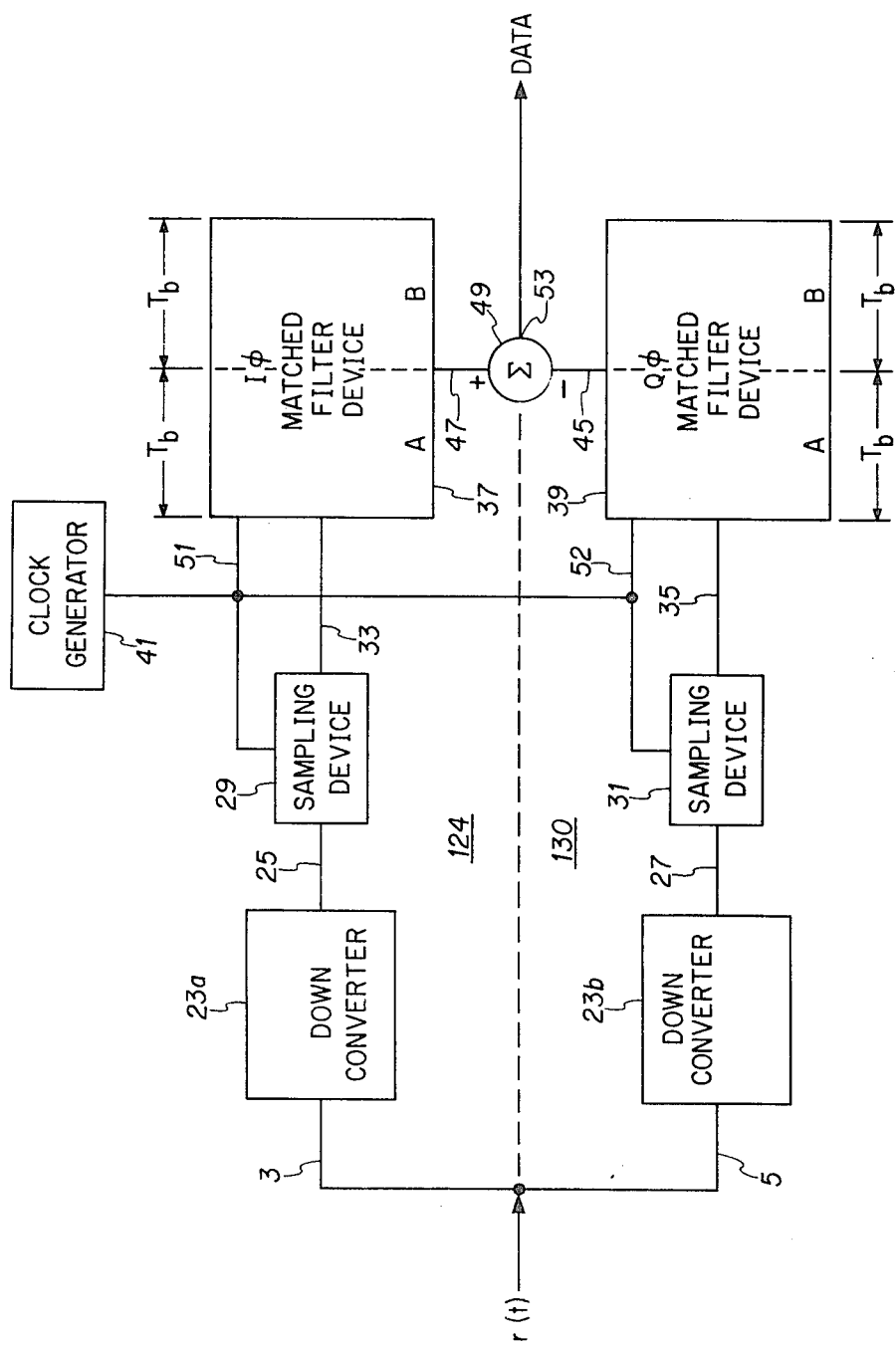
FIG. 1 is a block diagram of a phase modulated signal detector according to the teachings of this invention.

The differentially phase encoded radio signal detector shown in FIG. 1 has been found to be very effective in detecting phase modulated spread spectrum signals in which the chip code sequence is pseudo-randomly changing. A specific example of the type of radio signals that can be detected by the detector of FIG. 1 is provided in FIG. 2 in which waveform 20 is a special case of offset quadrature phase-shift-keying with cosine chip weighting and is minimum-shift-keying (MSK) digital modulation that provides a constant amplitude, phase continuous signal. The equation at 102 is the mathematical expression for waveform 20. $C_I$ and $C_Q$ represent the inphase and quadrature phase subchannel sequences, $\omega_o$ is the carrier frequency, and $T_c$ is the chip code.

Waveform 17 is the inphase component of waveform 20 and can be represented by equation 106 while waveform 19 is the quadrature component of waveform 20 and equation 107 is the mathematical representation of waveform 19.

Each of the vertical lines 1 through 16 represents one chip period. Data is detected by detecting the phase reversal or lack of phase reversal between chip code sequences. For example, in waveform 17 there is a phase change in the chip sequence at vertical lines 3, 7, 11 and 13 and therefore, the chip weighting changes. However, when there is no phase change, the chip weighting repeats itself as shown between vertical lines 5, 9 and 15. Waveform 19 has a phase change at vertical lines 2, 4, 6, 8 and 12 and a corresponding chip weighting change. However, there is not a phase change at vertical lines 10 and 14 and consequently the chip weighting repeats itself.

Figure 2:
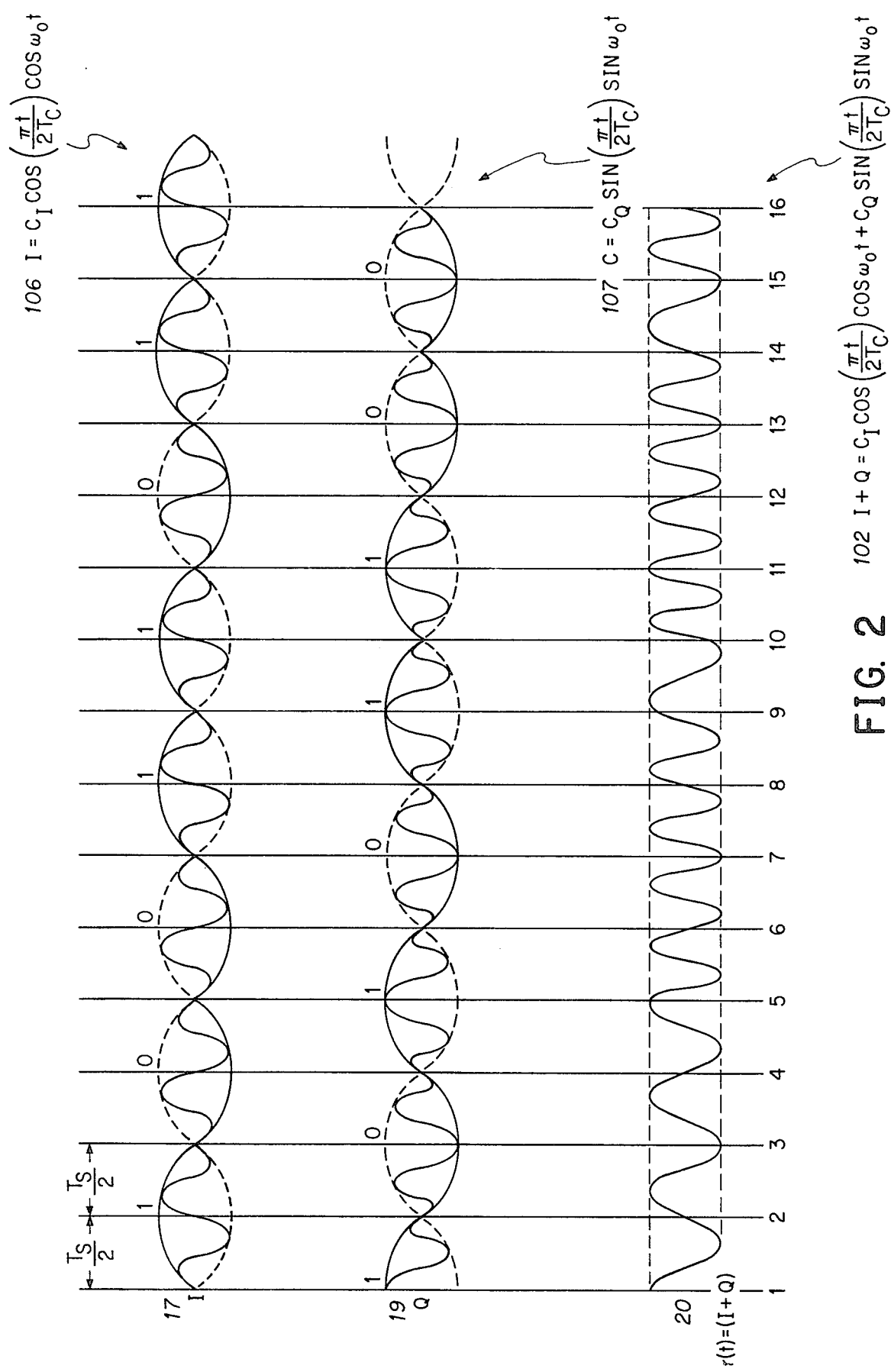
FIG. 2 is a waveform diagram of a MSK chip modulated, DCPSK spread spectrum radio signal.

Referring back to FIG. 1, a differentially phase encoded radio signal r(t) such as that represented by waveform 20 of FIG. 2 is applied to the inphase branch 124 on conductor 3, and simultaneously to the quadrature phase branch 130 on conductor 5 for demodulation. There is present a quadrature downconverter means that includes inphase downconverter device 23a in the inphase branch and a quadrature phase downconverter device 23b in the quadrature phase branch for quadrature downconverting of the received radio signal r(t) to baseband frequencies. After downconversion has been performed, the inphase baseband signal is applied to the inphase sampling device 29 by means of conductor 25, and the quadrature baseband signal is applied to the quadrature sampling device 31 by means of conductor 27 for conversion of the baseband signals to a pulse stream.

Both the inphase matched filter device 37 and the quadrature phase matched filter device 39 have an impulse response that is the time inverse of the pulse stream to which they are matched and are divided into A and B sections. Each section is designed to store a set of pulses that have an overall period $T_b$. Of course, $T_b$ is the period of one data symbol. The pulses are coupled from the inphase sampling device 29 to the inphase matched filter device 37 by means of conductor 33, and from the quadrature phase sampling device to the quadrature phase matched filter device 39 by means of conductor 35.

There is present a clock generator 41 that provides sampling pulses for controlling the sampling operation of both the inphase sampling device 29 and the quadrature phase sampling device 31. The transfer of data pulses across the storage cells of the matched filter devices 37 and 39 occurs periodically with the sample pulses. Therefore, the clock generator pulses are also applied to the matched filter devices by means of conductors 51 and 52. Even though the clock pulses that drive the matched filter devices, as well as the sampling devices, have the same period, it may, from a practical standpoint and characteristic of the devices, be necessary to insure that the pulses of the sampling devices are not coincidental with the pulses to the matched filter devices.

Figure 8:
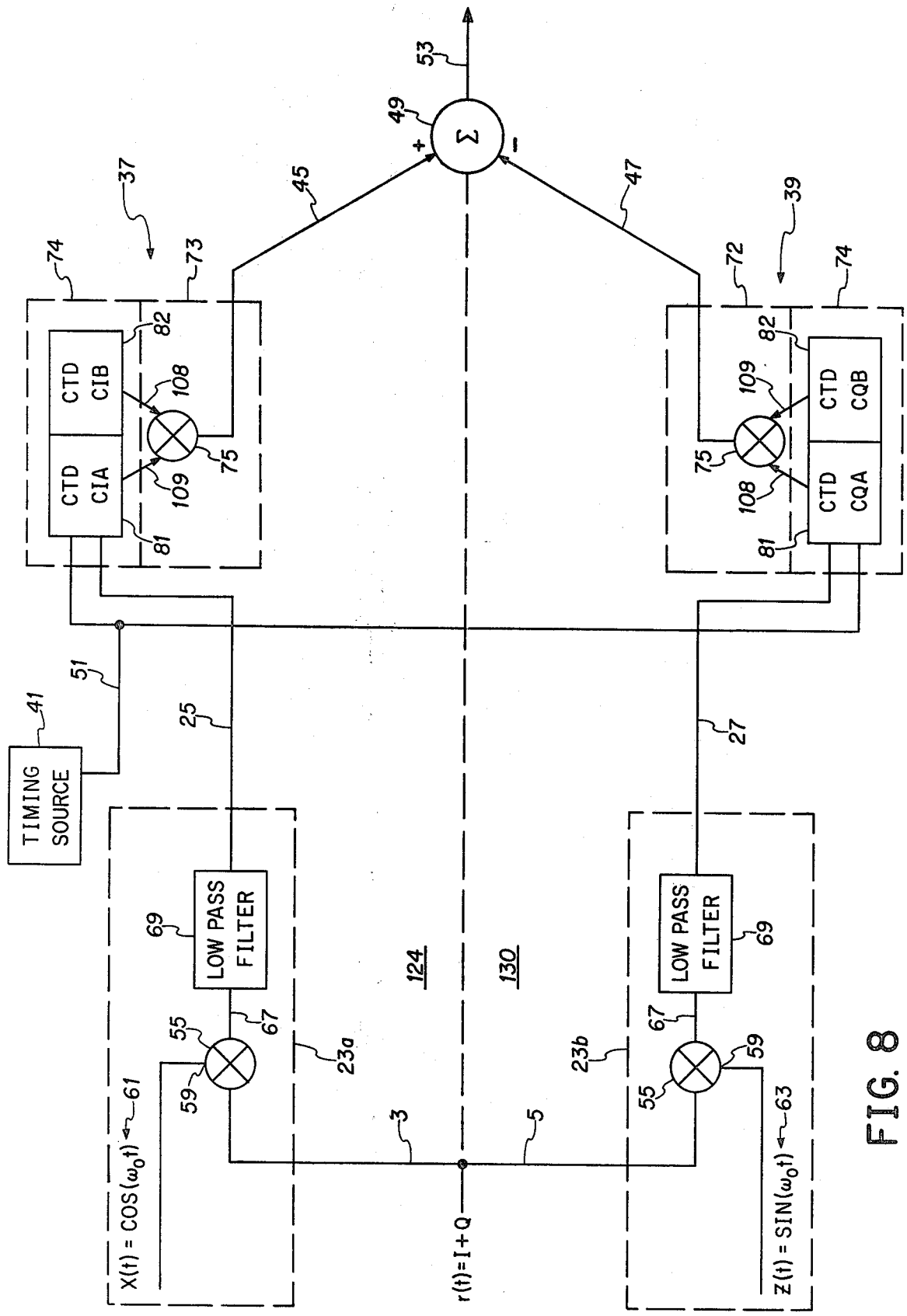
FIG. 8 is an embodiment of a coherent phase modulated signal detector that utilizes charge transfer devices as matched filters.

However, it is possible and even recommended as shown in FIG. 8, to combine the sampling function of the sampling device with that of the matched filter device.

The outputs of the two matched filter devices which are the result of comparison of the two data symbols that are stored therein, are summed by summing device 49. Conductor 47 connects the positive terminal of summing device 49 to the output of the inphase matched filter device 37 and conductor 45 connects the negative terminal of the summing means 49 to the quadrature phase matched filter device 39. The overall results being that the decoded data stream appears on the output terminal 53 of summing device 49.

Both the inphase downconverter device 23a and the quadrature phase downconverter device 23a can be any one of the devices known in the art for the downconversion of radio frequencies to baseband frequencies, such as the devices disclosed in copending application Ser. No. 919,021 filed on July 6, 1978 and assigned to the assignee of this application, as well as the devices of FIGS. 3.

Figure 3A:
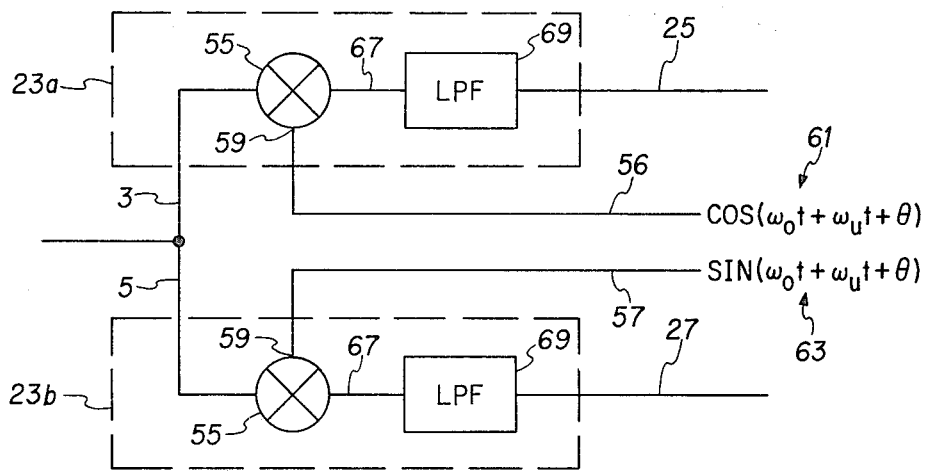
FIGS. 3a-3f are block diagrams of downconversion techniques that can be implemented in the embodiment of FIG. 1.

FIGS. 3a through 3f demonstrate some of the techniques that may also be used for downconversion to baseband frequency of the differentially phase encoded radio signal. Referring to FIG. 3a, the radio signal r(t) is applied to the inphase downconverter device 23a by means of conductor 3 and simultaneously to the quadrature phase downconverter device 23b by means of conductor 5. Each device consists of a mixer means 55 which is connected to a low pass filter means 69 by means of conductor 67. The mixer means 55 mixes the radio signal that appears on conductor 3, for the inphase case, with the local oscillator signal represented by the equation at 61 which is connected to terminal 59 of mixer means 55 by means of conductor 56. In the quadrature branch 5, the quadrature downconverter device 23b mixes the radio signal that appears on terminal 59 with the local oscillator signal that is represented by the equation at 63 to obtain, after passing the signal through the low pass filter means 69, the baseband signal that is present at conductor 27. It is obvious from comparison of the equation at 61 with the equation at 63 that the two local oscillator signals have a phase quadrature relationship. Therefore, an alternative means is provided in FIG. 3b which provides for applying the local oscillator signal that is present at 61 to terminal 59 of the mixer means 55 of the inphase downconverter device 23a and simultaneously to the quadrature hybrid device 1 to obtain the phase quadrature of the signal present at 61. The output of the quadrature hybrid device 1 is applied to the mixer means 55 of the quadrature phase downconverter device 23b for mixing with the radio signal present on conductor 5. This results in the mixing signals that are applied to terminal 59 of the mixing device 55 of the inphase downconverter device 23a, and the quadrature phase downconverter device 23b, being in phase quadrature with each other.

Figure 3B:
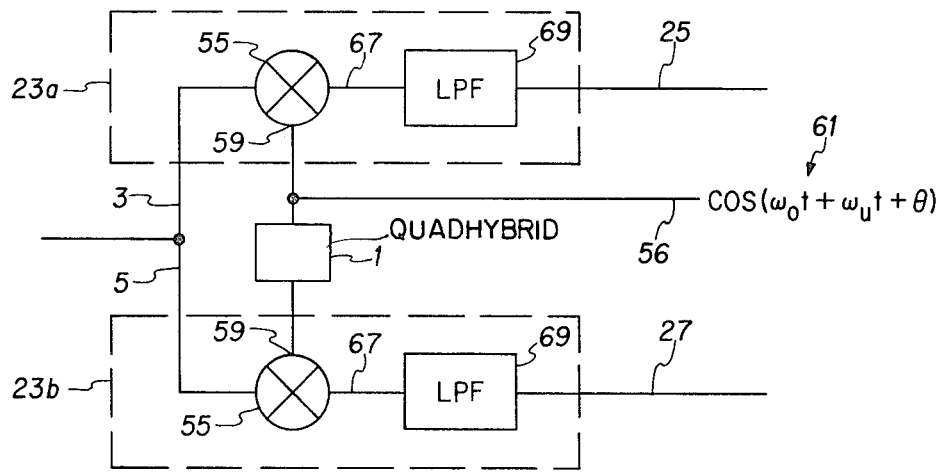
Figure 3C:
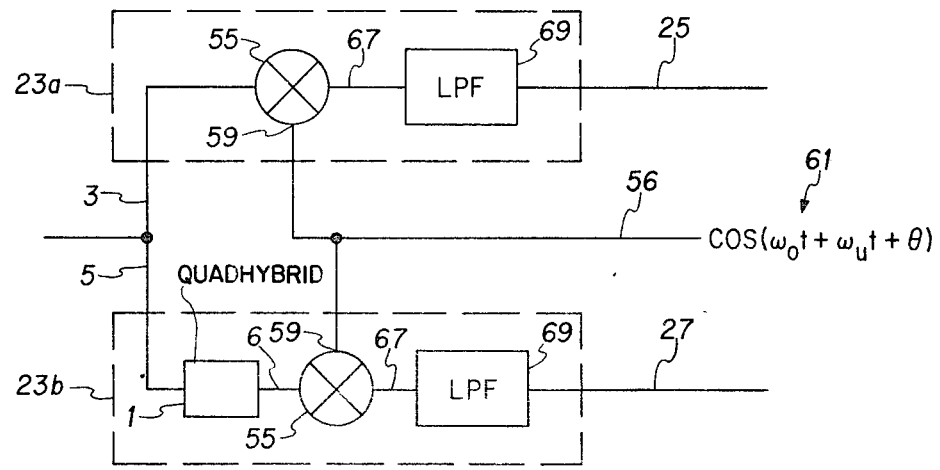

A variation of the device of FIG. 3b is provided in FIG. 3c which shows the quadrature hybrid device 1 positioned on conductor 5 between the source of the receive radio signal r(t) and the mixer means 55 of the quadrature downconverter device 23b. In this case the local oscillator signal at 61 is applied to both the inphase downconversion device 23a and the quadrature phase downconversion device 23b and has the same phase relationship. However, the signals that are present on the conductor 3 and the output 6 of the quadrature hybrid 1 are in phase quadrature with each other due to the operation of the quadrature hybrid 1.

Figure 3D:
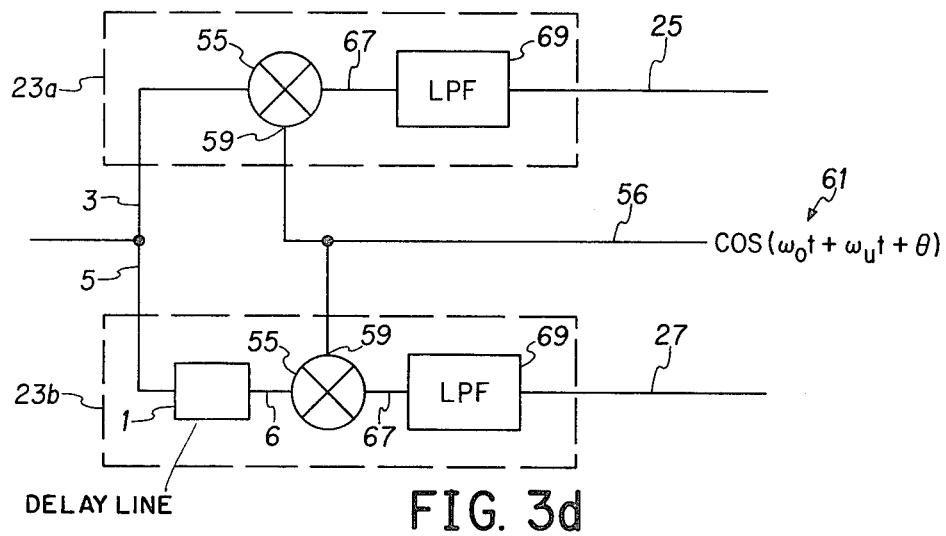

FIG. 3d is another embodiment of the downconverter devices 23a and 23b that were shown in FIG. 3c. However, the Hilbert's transformer that was a quadrature hybrid device 1 is shown as the more commonly used delay line. The delay line provides for delaying the signal that is present on conductor 5, thus resulting in a quadrature relationship across the delay line 1.

Figure 3E:
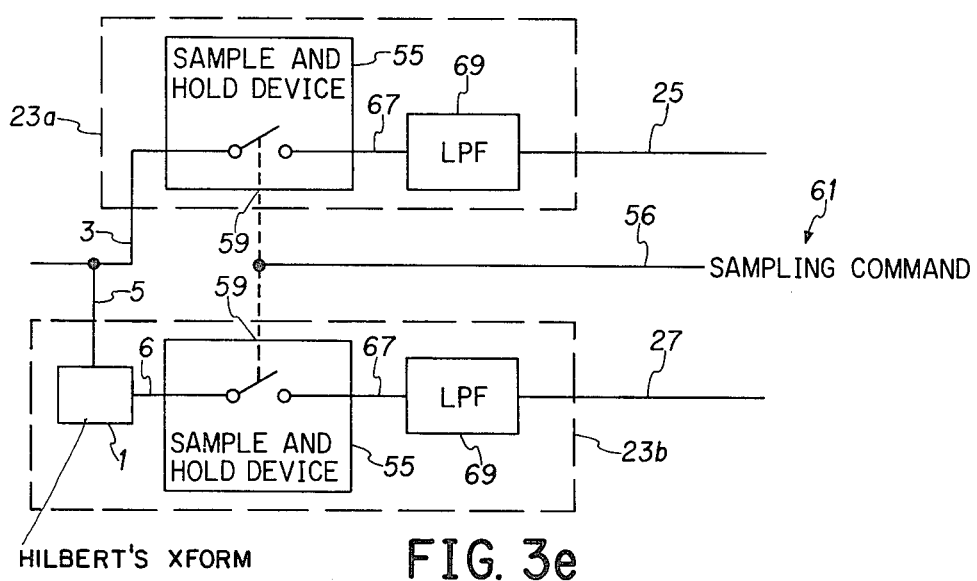

It has also been found due to recent advances in the state of the art that sample data techniques are also useful in downconversion of radio signals to baseband frequencies. Reference may be made to the above referenced application and FIG. 3e and FIG. 3f will demonstrate the use of sampled data techniques as a means of downconverting a radio signal. In FIG. 3e the inphase downconverter device 23a consists of a sample and hold device 55 and a low pass filter means 69 which is connected to the output of the sample and hold device 55 by means of conductor 67. In the quadrature phase branch the signal r(t) is applied to a Hilbert's transform device 1 which is connected to the quadrature phase downconverter device 23b by means of conductor 6. Each sample and hold device 55 of the inphase downconverter device 12a and the quadrature phase downconverter device 23b is provided, as shown at 61, with a sampling command signal that is a submultiple of the carrier frequency and is also at least twice the information bandwidth. The pulses are applied to each sample and hold device by means of terminal 59.

Figure 3F:
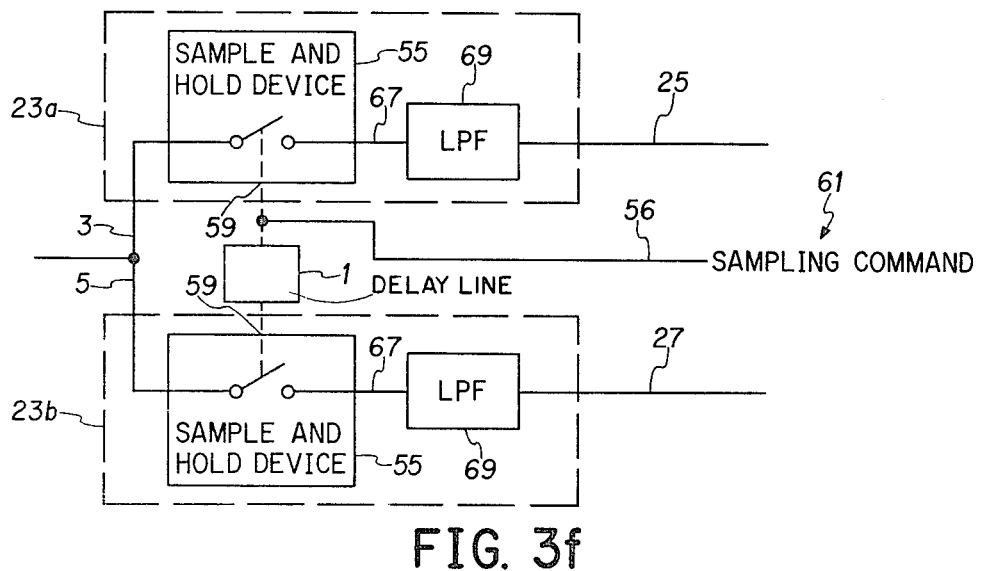

In FIG. 3e, as in the case of FIG. 3c and FIG. 3d, the radio signals that are applied to the inphase downconverter device 23a and the quadrature phase downconverter device 23b are in phase quadrature with each other as a result of the Hilbert's transform device 1 which may also, of course, be either a delay line or a quadrature hybrid device. In FIG. 3f the radio signals that are present on the input of the inphase downconverter device 23a and the quadrature phase downconverter device 23b are in phase with each other. However, there is present a delay line 1 dispersed between the source of the sampling commands at 61 and the quadrature phase downconverter device 23b. The pulses to either the inphase downconverter device 23a or the quadrature phase downconverter device 23b are out of phase with each other by a period that corresponds to ¼ of a cycle of the carrier frequency. Regardless of the method used, the overall result is the presence of two baseband signals in phase quadrature with each other on conductors 25 and 27.

Figure 4:
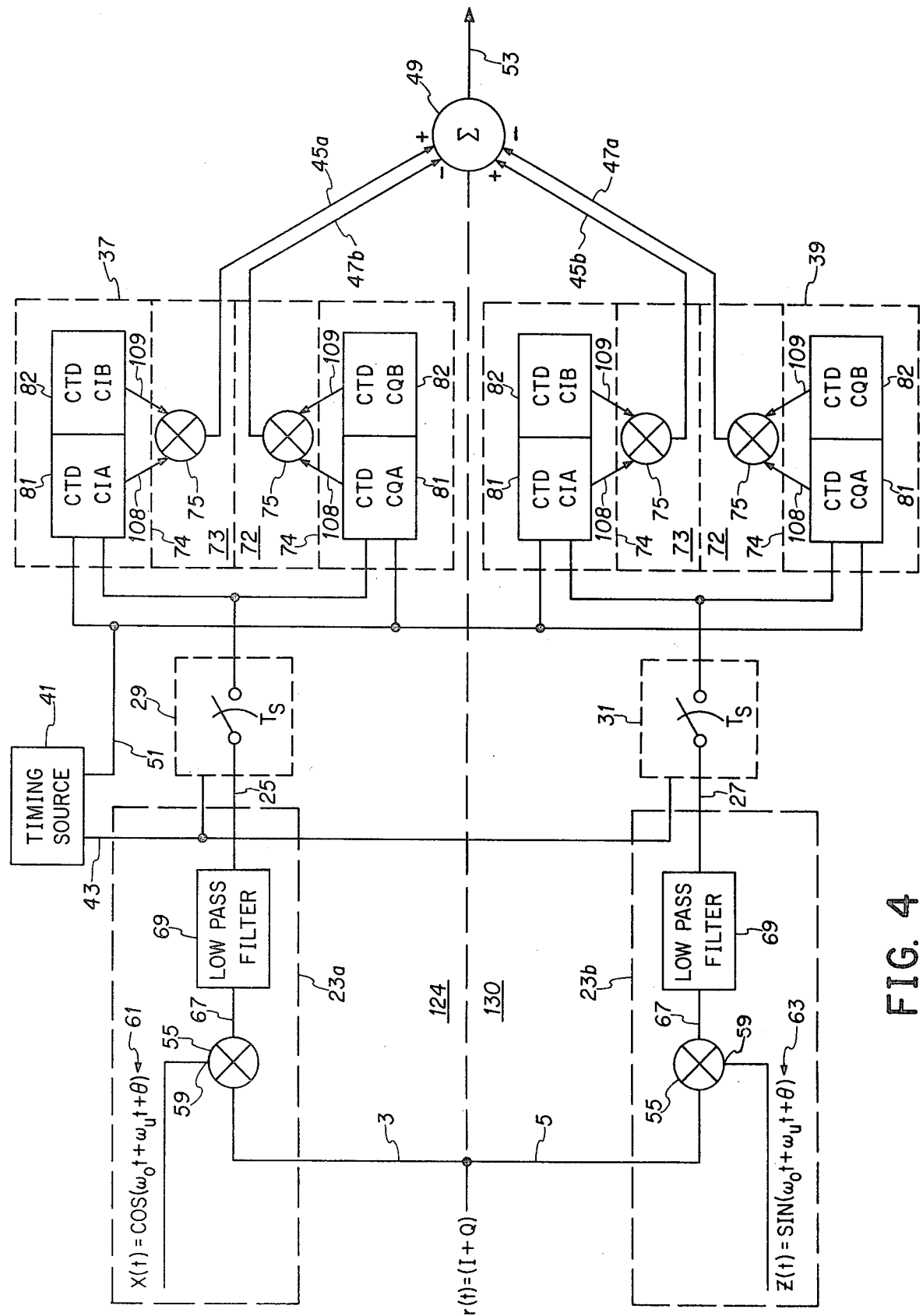
FIG. 4 is a block diagram of a phase modulated signal detector that utilizes charge transfer devices as matched filters.

FIG. 4 is a phase modulated signal receiver that can be used for either coherent or noncoherent two phase differentially phase-shift-keying, 2 DPSK and 3 DCPSK. Both the inphase downconverter devices 23a and quadrature phase downconverter 23b, as in the case of FIG. 3a, consist of a mixer means 55 connected to a low pass filter means 69 by conductor means 67. For the inphase mixer means 23a, there is applied to terminal 59 of the mixer means 55 a local oscillator signal shown at 61. The local oscillator signal shown at 61 is for the noncoherent mode of operation and has a general equation $x(t) = \cos(\omega_o t + \omega_u t + \theta)$ with $\omega_u$ being the drift and Doppler frequency and $\theta$ being the static phase shift; however, in the case of coherent DPSK, $(\omega_u t + \theta)$ would be zero. In the quadrature phase channel 130, the local oscillator signal shown at 63 has a quadrature relationship with that shown at 61 and it is represented by the equation $z(t) = \sin(\omega_o t + \omega_u t + \theta)$ and, as in the case with the inphase signal shown at 61, $\omega_u t$ represents the drift and Doppler frequency and $\theta$ the static phase shift. In general, once a message has started to be received by the receiver, the drift frequencies and the static phase shift are assumed to be constant. Although one embodiment of the downconverter device was disclosed in FIG. 4, any of the embodiments known in the art are applicable, as well as those disclosed in FIGS. 3a through 3f. Inphase sampling device 29 and quadrature phase sampling device 31 each consist of a sampling switch for conversion of the baseband signals into a pulse stream. Table I shows performance degradation versus sample rate for the operation of both the inphase sampling device 29 and the quadrature phase sampling device 31. The faster the sampling rate as shown in Table I, the minimum dB degradation of the signal occurs. As will be discussed later, the sampling operation may be included in the operation of the matched filter devices 37 and 39.

When the receiver is operated in the noncoherent mode there is an uncertainty in the received signal which is represented by the term $\omega_u t + \theta$ in the local oscillator frequencies, therefore, to ensure the overall sensitivity of the receiver, each channel, both the inphase channel and the quadrature channel, detect both the inphase and quadrature phase components that are present in the receive radio signal. Therefore, there is present in each channel, both an inphase matched filter device 73 and a quadrature phase matched filter device 72, which combine to make the overall matched filter means 37. Both matched filter devices 72 and 73 are essentially storage and comparator devices and each consists of a charge transfer device (CTD) match unit 74 having two sections, an A section and a B section, with each section having storage capacity, in individual storage cells, where each cell will store a single sample pulse, for the number of pulses necessary to store one data symbol; and a multiplier means for comparison purposes. The minimum number of cells required for each section of the (CTD) matched unit 74 is equal to the sampling rate times the number of chips per symbol or bit. The output of each section is multiplied by multiplier means 75 and connected to summing device 49 by means of conductors 47b and 45a.

In the quadrature branch 130 at matched filter means 39, there is also present an inphase matched filter device 73 and a quadrature phase matched filter device 72. Of course, as in the cases of the matched filter means 37 of the inphase channel 124, each (CTD) match unit 74 has a storage capacity of approximately one data symbol in each A and B section. The output of both matched filters 73 and 72 are multiplied by a multiplier means 75 and applied to summer means 49 by means of conductors 47a and 45b. The summing device 49 sums the output of the inphase matched filter devices 73 that appear on conductors 45a and 45b and subtracts the output of the quadrature phase matched filters 72 that appear on conductors 47a and 47b. The resulting decoded data appears on terminal 53 of the summing device 49.

Figure 5:
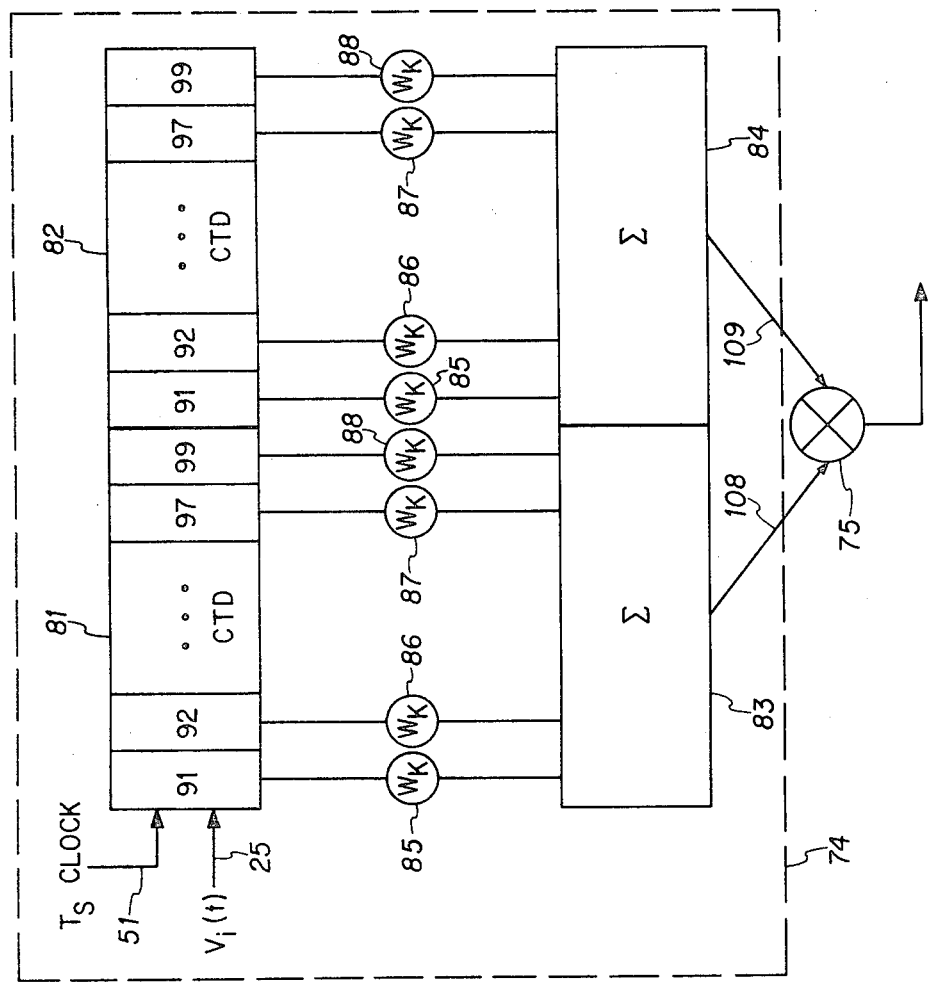
FIG. 5 is an embodiment of the matched filter device of the receiver of FIG. 4.

Matched filter devices 73 for the inphase case and 72 for the quadrature phase case can comprise the embodiment shown in FIG. 5 in which there are either two charge transfer devices 81 and 82 or there are two sections 81 and 82 of a signal charge transfer device, in either case each section is capable of storing the sampled chip codes that correspond to one data symbol or unit which hereafter is referred to as one sampled bit length.

THEORY OF OPERATION OF CHARGE TRANSFER DEVICE

In general, charge transfer devices (CTD) or interchangeably charge coupled devices (CCD) operate by transferring packets of minority charges which represent sampled analog symbols, from one potential well to another. The potential wells are formed by a linear array of deep depleted MOS capacitors, either on a uniformly substrate (surface channel), or a substrate with a thin, depleted layer for opposite conductivity at the surface (buried channel). In operation, minority charges (electrons) exist in a thin inversion layer at the oxide semiconductor interface. Since a charge always moves to the local potential minimum, charges are transferred from one potential well to the other by application of appropriate voltages to the electrodes. There are essentially two measurements that primarily determine the charge transfer device performance: (1) the time necessary to transfer charges from one storage site to the next, and (2) the fraction of the original charge that is transferred. The two mechanisms responsible for limiting charge transfer are thermal diffusion and fringe field drift. Thermal diffusion alone limits clocking speed to about 1 megahertz. Charge transfer speed is enhanced due to a small component of the electrical field in the direction of the charge transfer resulting from externally applied gate voltages. The fringing field is responsible for clock rates to about 10 to 15 megahertz in surface channel devices.

Charge transfer efficiency is determined by (1) the extent to which potential barriers exist between two potential wells; and (2) loss of carriers due to surface trapping effects. Overlapping silicon gates have helped to minimize charge transfer inefficiency due to potential barriers. Reference may be made to "Physics and Applications of Charge-Coupled Devices", *IEEE International Convention and Exposition*, G. F. Amelio, Vol. VI, New York, March 1973. Charge lost to fast interface surface states is minimized in the buried channel structure by ensuring that the depleted region wells start to form below the surface within the bulk of the semiconductor. Improvement in the charge transfer device of the buried channel is accompanied by an improvement in clocking speed. The buried channel structure places the channel a greater distance from the gates, thus increasing the relative importance of the fringing field depths.

In recent developments, as announced in "Speed of CCD Memory is Boosted Tenfold", *Electronic Design*, Vol. 23, No. 26, Dec. 20, 1975, clocking speeds above 200 megahertz have been reported and charge transfer efficiencies of 99.999 percent have been measured in the buried channel devices. Reference may be made to "Basic Concepts of Charge-Coupled Devices", *RCA Review*, W. F. Kosonocky, J. E. Carnes, Vol. 36, September, 1975.

It has been found that the application of charge coupled devices to match filtering is very effective, especially as disclosed herein, in differential phase modulation techniques used in a spread spectrum system. As discussed earlier, a matched filter is one whose impulse response is the time inverse of the signal waveform to which it is matched. If a signal $V_i(t)$ is a waveform that exists over the interval [0,T] and is the input to a linear time-invariant filter with impulse response h(t), then the output is given by:

$$V_o(\tau) = \int_0^T V_i(t) h(\tau - T) dt; \leq \tau \leq T \quad (1)$$

establishing the filter's response as the time inverse of $V_i(t)$, the output signal is maximum at $\tau = T$.

$$V_{max} = V_o(T) = \int_0^T V_i(t) V_i(t - T) dt. \quad (2)$$

FIG. 5 is a diagram of the implementation of the matched filter device 74 using charge transfer devices.

The matched filter 74 consists of a CTD delay line 81 and 82 each having N tapped delay stages or storage cells 91 through 99. The input signal $V_i(t)$ is sampled by the operation of the clock signal that is present on conductor 51, the occurrence of which will cause a charge proportional to the amplitude of the signal that is present on conductor 25 to be stored in the first storage cell 91 and shifted to the right, one cell at a time, at the occurrence of each subsequent clock pulse. Each storage cell 91 through 99 of Sections 81 and 82 is tapped, multiplied by the weighting coefficient $W_k$, and summed by summing device 83 and 84. The weighting coefficients $W_k$ (85 through 88) are selected to achieve an impulse response that is the time inverse of the signal $V_i(t)$ and results in the performing of an approximation of equation 2 that can be mathematically represented by equation 3:

$$V_o(t) = \sum_k W_k V_i(t - (k - 1)T). \quad (3)$$

The selection of the coefficients of weighting devices 85 through 88 are determined by the expected chip code per bit. By knowing the expected chip code for a given symbol, and by appropriately selecting the coefficient of the weighting devices 85, 86 through 87 and 88, it can be arranged so that the input to the summing devices 83 and 84 of FIG. 5 is a constant value for all inputs when a data symbol is stored in each charge transfer device 81 and 82. When there are data symbols stored in 81 and 82, the output of summing devices 83 and 84 is applied to multiplier means 75 by means of conductors 108 and 109 respectively. Multiplier means 75 makes the phase comparison of the stored data symbol to determine if the phase between data symbols is either identical or opposite. In either case, the magnitude of the output of multiplier means 75 that appears on conductor 45 is constant at the bit sampling instant, but the polarity of the multiplier output depends upon the actual data symbol transmitted. Thus, it can readily be seen that this device will facilitate the decoding of DCPSK and DPSK signals.

Figure 6:
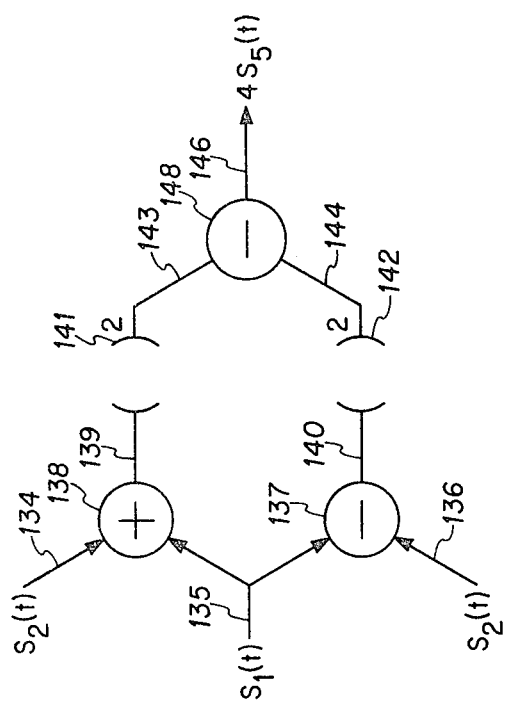
FIG. 6 is an embodiment of a means for implementing the multiplication function for the matched filter device of FIG. 5.

The multiplier means 75 may be implemented by the adding, subtracting and squaring operation shown in FIG. 6. For the purposes of discussion, the output of the summing device 83 of FIG. 5 that is present on conductor 108 can be represented by $S_1(t)$ and the output of summing device 84 that is present on conductor 109 can be represented by $S_2(t)$. Referring to the signal flow diagram of FIG. 6, $S_1(t)$ is applied to adder 138 and substractor 137 by means of flow line 135. $S_2(t)$ is applied to adder 138 by flow line 134 and to subtractor 137 by means of flow line 136. A squaring operation is performed upon the sum of $(S_1(t)+S_2(t))$, which is the functional result of adder 138 squaring function 141 which is joined to adder 138 by flow line 139. The result of the squaring function of flow line 143 is $(S_1(t)^2+2S_1(t)\ S_2(t)+S_2(t)^2)$. Subtractor 137 subtracts $S_2(t)$ from $S_1(t)$ with the function on flow line 140 being $(S_1(t)-S_2(t))$. After the squaring operation by squaring function 142, $(S_1(t)^2-2S_1(t)\ S_2(t)+S_2(t)^2)$ is the functional result present on flow line 144.

Subtracting flow line 144 from 143 $(S_1(t)^2+2S_1(t)\ S_2(t)+S_2(t)^2)-(S_1(t)^2-2S_1(t)\ S_2(t)+S_2(t)^2)$ by subtractor 148, the resultant present on flow line 146 is $4S_5(t)=4S_1(t)\ S_2(t)$. This result shows that multiplier 75 can functionally be implemented by adding, subtracting and squaring with the overall product being $S_1(t)\ S_2(t)$ times a gain factor of 4.

The matched filter device of FIG. 5 is used when the chip code is constant. However, for pseudo-randomly changing chip code, reference should be made to FIG. 7, which is a multifunctional charge transfer device that is used for signal processing. In the case of pseudo-randomly changing chip code sequence, the matched filter of FIG. 5 is inappropriate or when the inphase and quadrature phase subchannels carry independent chip sequences, the implementation of phase modulated signal detector using charge transfer devices will require designing and fabricating two separate devices having different weighting coefficients. A more attractive approach is to build a programmable device which could perform a multitude of functions that are useful in the detection process, as well as the overall receiver, itself.

Figure 7:
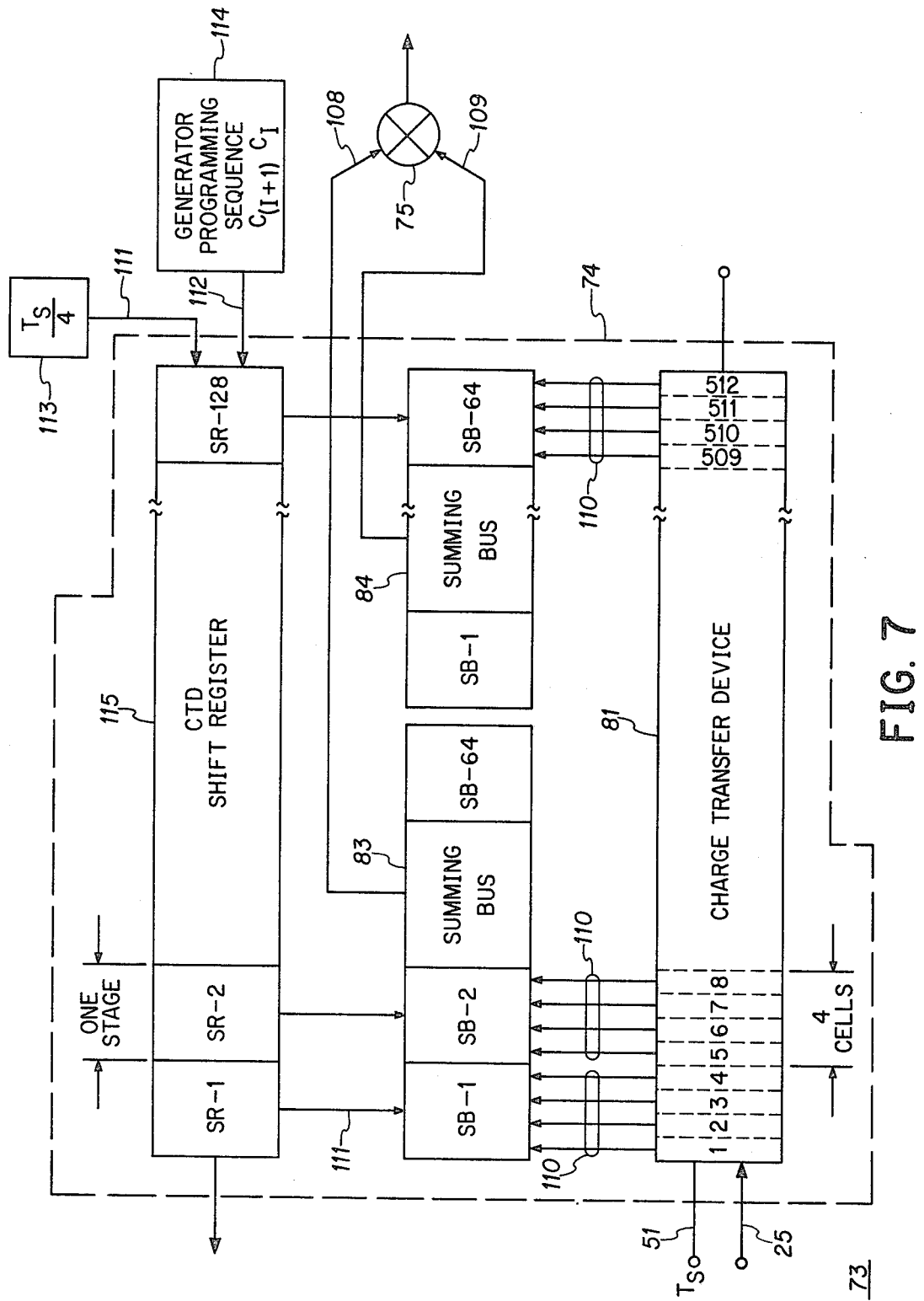
FIG. 7 is another embodiment of the matched filter device of the receiver of FIG. 4.

FIG. 7 represents a block diagram of a multifunctional programmable matched filter device 73. However, this device can also be used for matched filter device 72. Appropriately programmed, this device will (1) perform matched filtering for each inphase and quadrature phase subchannel, each bit or symbol being independently programmed for a unique chip sequence, (2) provide a delay version of the input signal, and (3) deliver the integrated output of the sampled signal stored in both halves of the device.

For simplicity of discussion, only device 73 for the inphase component will be discussed; however, the identical device could be used for both the inphase channel device 73 and the quadrature phase channel device 72. A charge transfer device having a plurality of storage cells, for example, the charge transfer device 81 used in FIG. 7, having 512 storage cells is shown. A pulse from a clock generator is used to sample and propagate the amplitude of the signal that appears on conductor 25 across the charge couple device at the sampling rate. If a symbol comprises a chip code of 128 chips with 64 chips inphase and 64 chips in quadrature phase, then it is necessary that the charge couple device 81 provide 512 storage cells for two data symbols for a sampling rate of two times the chip rate. Shift register device 115 has a storage capacity for 128 chips SR-1 through SR-128 which, of course, corresponds to two symbols. Clock source 113 provides clock pulses for clocking in the chip code sequence $C_{(I+1)}$, $C_I$ that is generated by code generator 114 through conductor 112 into the shift register 115. The period of the clock pulses $T_{s/4}$ is four times longer than the sampling clock pulses $T_s$. There are provided two summing buses, 83 and 84, each summing bus is divided into 64 sections, SB-1 through SB-64. Conductor groups 110 couple the outputs of the charge couple device 81 into the summing buses in groups of four so that SB-1 receives four outputs from the charge couple device, and one output from the shift register 115. Each section SB-1 through SB-4 of summing buses 83 and 84 contains four weighting devices which are multiplied with the sampled data so that the output of weighting and summing buses 83 and 84 will be either a 1 or a 0 at the sampled data time. The overall integrated output is coupled to multiplier 75 by means of conductors 108 and 109.

Although the receiver of FIG. 4 can be used for the receipt of both coherent and noncoherent differentially encoded radio signals, from a cost standpoint, it is more economical for coherent cases to use the receiver that is shown in FIG. 8. A coherent radio signal such as that present on line 20 of FIG. 2, is applied to the inphase branch 124 and the quadrature phase branch 130 of the receiver of FIG. 8 for quadrature mixing and downconverting. The inphase branch 124 has a downconverter device 23a which, of course, can be any of the devices known in the art or discussed in the FIGS. 3, however, for explanation purposes, the device of 23a of FIG. 8 has a mixer means 55 where a local oscillator signal is applied to terminal 59 for mixing with the incoming radio signal that is present on conductor 3. It should be noted that the signal r(t) represented by the equation at 61, $x(t) = \cos \omega_o t$, being that the unit is coherent the phase relationship and the Doppler relations are known, therefore, there are no $(\omega_u t + \theta)$ components present. After downconversion, the baseband signal is applied to the inphase matched filter 73 for sampling and filtering. The operation of the inphase matched filter 73 was priorly dicussed, and the compared results of the multiplier 75 appears on conductor 45 which connects the compared results to the summing device 49. The quadrature phase branch 130 is connected to the quadrature downconverter device 23b where the receive signal is mixed with a local oscillator signal mathematically represented by the equation $z(t) = \sin \omega_o t$ as shown at 63. Again because this is a coherent signal and all of its characteristics are known there is no Doppler effect or phase component present. After sampling the output of the quadrature downconversion device, the sampled baseband signal is passed through quadrature matched filter device 72 with the output of multiplier device 75 being connected to the negative terminal of summing device 49, which subtracts the quadrature channel from the inphase channel and the overall decoded results are present on terminal 53.

Figure 9:
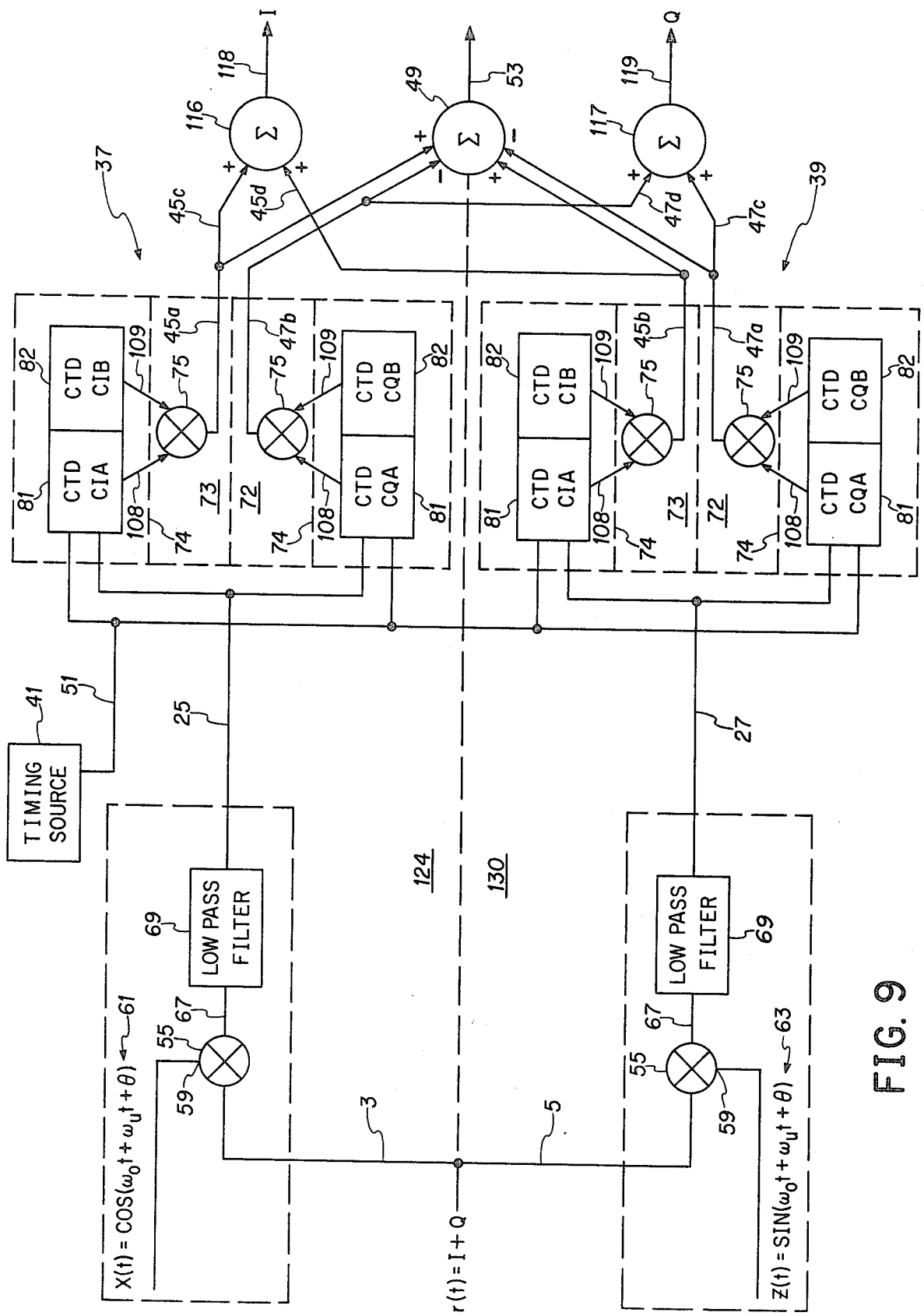
FIG. 9 is an embodiment of a four phase differentially phase encoded radio receiver that utilizes charge transfer devices as matched filters.

FIG. 9 is an example of a four phase differentially phase encoded radio receiver. The basic operation of the inphase branch 124 and the quadrature phase branch 130 of the embodiment of the invention as shown at FIG. 9 is identical to those described in conjunction with FIGS. 1 and 4. After the sampled baseband signal has passed through the matched filter devices 37 and 39, the inphase component that results from the operation of matched filter device 37 is present on conductors 45a and 45c and is applied to summing devices 49 and 116. Summing device 116 sums the inphase component that results from the operation of the quadrature matched filter device 39 and is present on conductor 45d with the signal present on conductor 45c to obtain the inphase (I) message output that is presented on conductor 118. The Q component of the four phase differentially phase encoded radio signal appears on terminal 19 and is the result of the summing device 117 summing the quadrature output of the inphase matched filter 37 as it appears on terminal 47d with the quadrature output of quadrature matched filter device 39 that appears upon terminal 47c. There is also present a two phase component on terminal 53 of summing device 49, the operation of which is similar or identical to that discussed in conjunction with FIG. 4.

Figure 10:
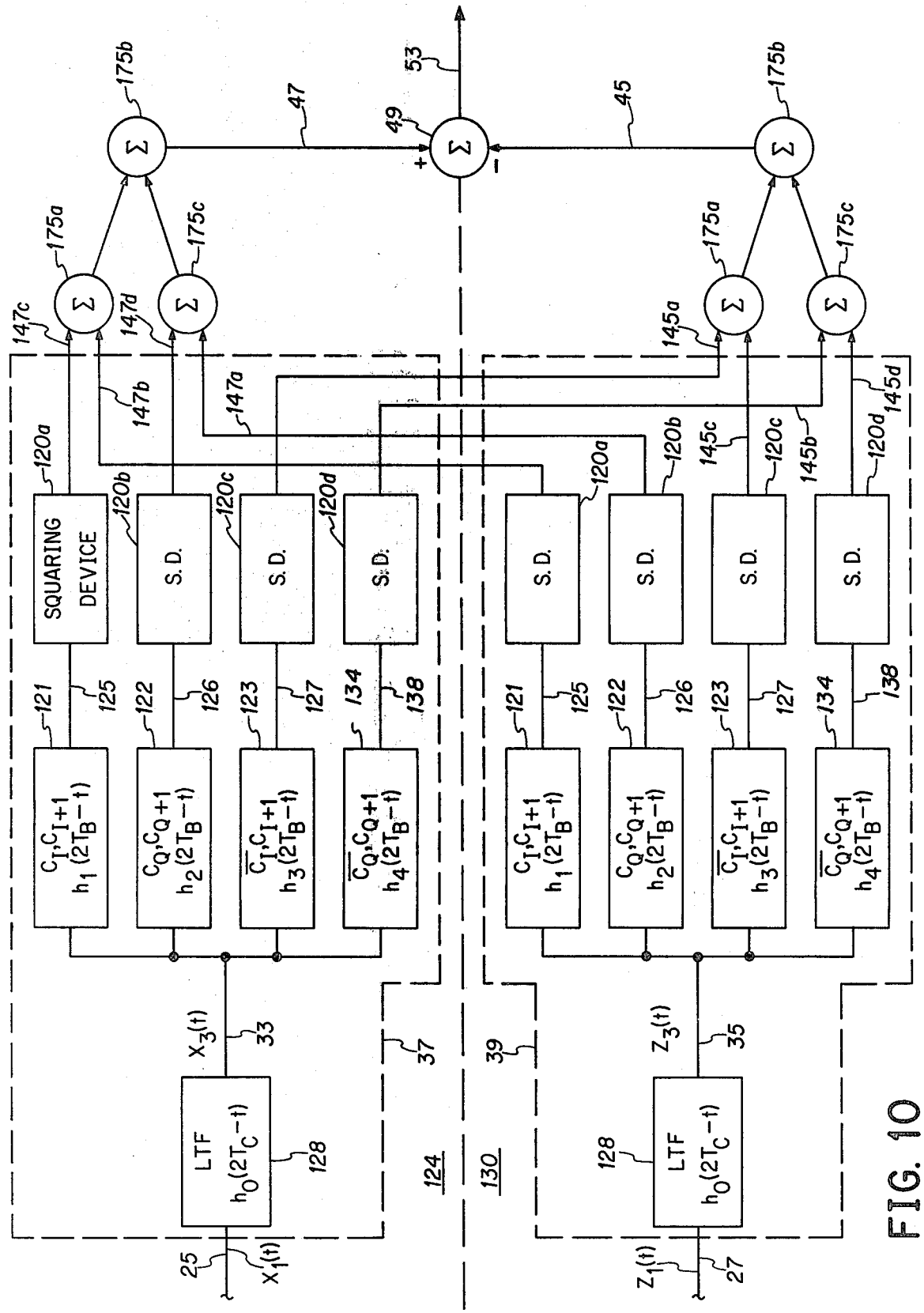
FIG. 10 is another embodiment of a phase encoded signal detector that utilizes charge transfer devices as matched filters.

Another approach for a differentially phase encoded radio signal detector using charge transfer devices (CTD's) or charge couple devices (CCD's) and sample data techniques is shown in FIG. 10. As discussed in the description of FIGS. 1 and 4, the receive signal r(t) is quadrature mixed with the local oscillator signal which may have, for example, as in the noncoherent mode of operation, an offset infrequency that may be mathematically represented by the term $(\omega_u t + \theta)$ where $\omega_u$ is the drift frequency and $\theta$ is the static phase shift. After the baseband signals are achieved for the inphase channel 124 and the quadrature phase channel 130, the inphase baseband signal $x_1(t)$ is applied to the chip matched filter device 128 the inphase matched filter device 37 by means of conductor 25 and the quadrature baseband signal $z_1(t)$ is applied to the chip matched filter device 128 of the quadrature phase matched filter device 39 by means of conductor 27 for correlation. Because both the inphase channel 124 and the quadrature phase channel 130 have similar chip matched filter devices 128 and symbol matched filter devices 121 through 123 and 134, only the inphase channel 124 will be discussed at this time. The correlated output of the chip matched filter device 128 is connected to the symbol matched filter devices 121 through 123 and 134 by means of conductor 33. The symbol matched filter devices are matched to both inphase and quadrature phase chip sequences as follows: 121 which has the transfer function of $h_1(2T_B - t)$ is matched to two inphase chip sequences $C_I, C_{I+1}$; 122 which has the transfer function $h_2(2T_B - t)$ is matched to the quadrature chip sequence $C_Q, C_{Q+1}$; 123 which has the transfer function of $h_3(2T_B - t)$ is matched to the chip sequence $\overline{C}_I, C_{I+1}$; and 134 which has the transfer function of $h_4(2T_B - t)$ is matched to the chip sequence $C_Q, \overline{C}_{Q+1}$.

As was pointed out under the discussion of FIG. 6, it is possible to implement a multiplication function by adding, squaring and subtracting. This is provided for in FIG. 10 wherein there is a squaring device 120a connected to matched filter device 121 by conductor 125; squaring device 120b is connected to matched filter device 122 by conductor 126; squaring device 120c is connected to matched filter 123 by conductor 127 and squaring device 120d is connected to matched filter 134 by conductor 138. The subtraction function is performed by the matched filter devices 123 and 134 wherein the devices are matched to the inverse of the chip sequence waveform. This is denoted in FIG. 10 as $\overline{C}_I$ and $\overline{C}_Q$. Summing device 175a of the inphase channel 124 sums the outputs of the inphase matched filter devices 121 after being squared by squaring devices 120a. Conductor 147c joins the squaring device 120a of the inphase channel 124 to the summing device 175a and conductor 147b joins the output of the squaring device 120a of the quadrature phase channel 130 to summing device 175a of the quadrature phase channel 130. Similarly, the summing device 175c of the quadrature phase channel 130 sums the output of the quadrature matched filter devices 122 after being squared by squaring devices 120b. Summing device 175c of the inphase channel is connected to the output of the squaring device 120b by means of conductor 147d for the inphase channel 124 and conductor 147a connects the quadrature phase channel's 130 squaring device 120b to summing device 175c of the quadrature phase channels. The outputs of summing devices 175a and 175c are summed by summing device 175b for each channel 124 and 130 with the resulting summation being applied to summing device 49 by means of conductor 47 and 45 respectively. Likewise, the matched filter devices that are matched to the inverse of the chip sequence are summed and handled; the output of the inverse inphase matched filter devices 123 and the output of the inverse quadrature phase matched filter device 134 are summed by summing devices 175a and 175c in each channel. Summing device 175c is connected to the output of squaring device 120c of the inphase channel 124 by means of conductor 145a and the output of squaring device 120c in the quadrature phase channel 130 is connected to summing device 175c by means of conductor 145b. The squaring device 120d of the inphase channel 124 and 120d of the quadrature phase channel 130 is summed by means of summing device 175c of the quadrature phase channel 130 is connected to the squaring device 120d of the inphase channel 124 by means of conductor 145b, and squaring device 120d of the quadrature phase channel 130 is connected to summing device 175c by means of conductor 145d. The outputs of the summing devices 175a and 175c of the quadrature phase channel 130 are summed by summing device 175b in the quadrature phase channel, the output of which is also connected to summing device 49 by means of conductor 45. Summing device 49 subtracts the quadrature phase channel from the inphase channel and provides the difference of the two channels upon conductor 53.

Figure 11:
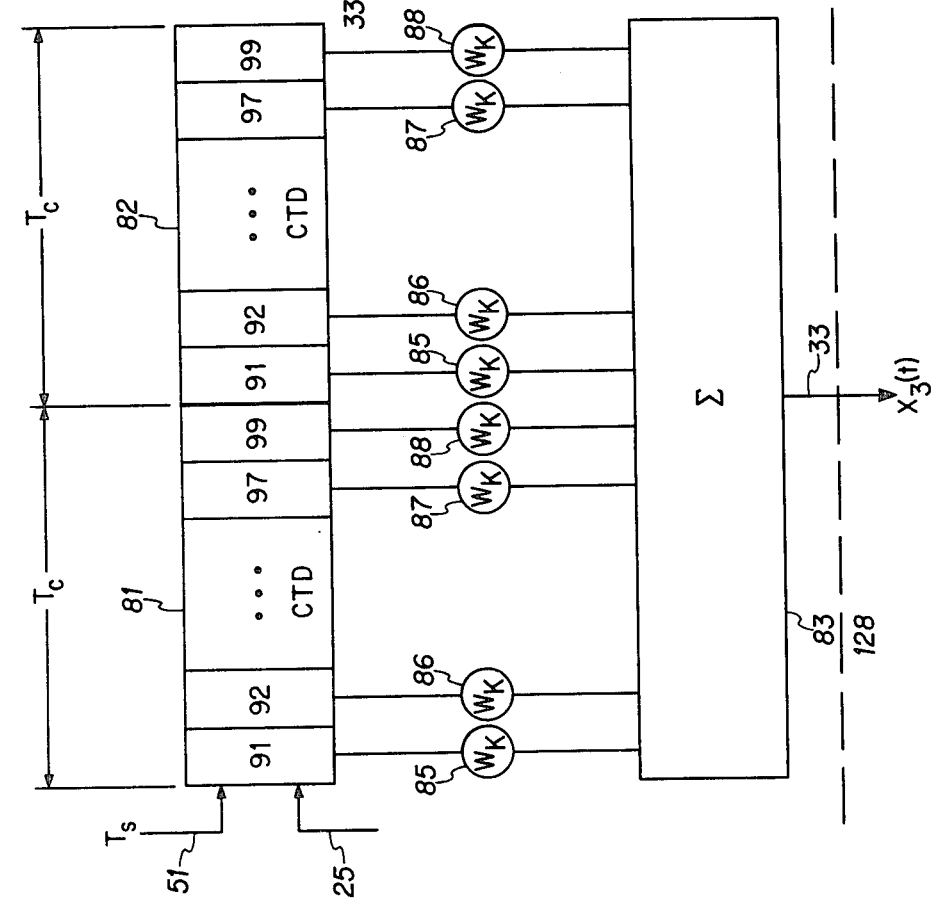
FIG. 11 is an embodiment of the chip matched filter devices for the receiver of FIG. 10.

Chip matched filter devices 128 of the inphase channel 124 and the quadrature phase channel 130 are shown in FIG. 11 wherein there is present a charge transfer device or charge couple device which has two sections 81 and 82, which may also be two independent devices that are coupled together. In any event, conductor 25 provides the baseband signal to the input of charge transfer device 81. In addition conductor 51 provides the sampling clock which is a submultiple of the chip period. Upon the occurrence of each sample clock on conductor 51, the amplitude of the signal that is present on conductor 25 is stored in the first storage cell 91 of the charge transfer device 81. Upon the occurrence of each subsequent sample pulse on conductor 51, the information that is stored in cell 91 is shifted to storage cell 92 and transferred across the CTD as new data is stored within the preceding cell. The total number of storage cells within each CTD 81 and 82 is equal to the number of samples taken per chip. Because the devices 81 and 82 have tapped outputs, the information is taken from the outputs and applied to weighting coefficient devices or multiplier devices 85, 86, 87 and 88 which are used to match the matched filter to the chip waveform. Summing device 83 sums all of the weighted outputs from charge transfer devices 81 and 82 and provides a summation on conductor 33 which is denoted $x_3(t)$ for the inphase channel 124 of FIG. 10. For the quadrature phase channel 130 the output of the chip matched filter device is denoted as $z_3(t)$.

Figure 12:
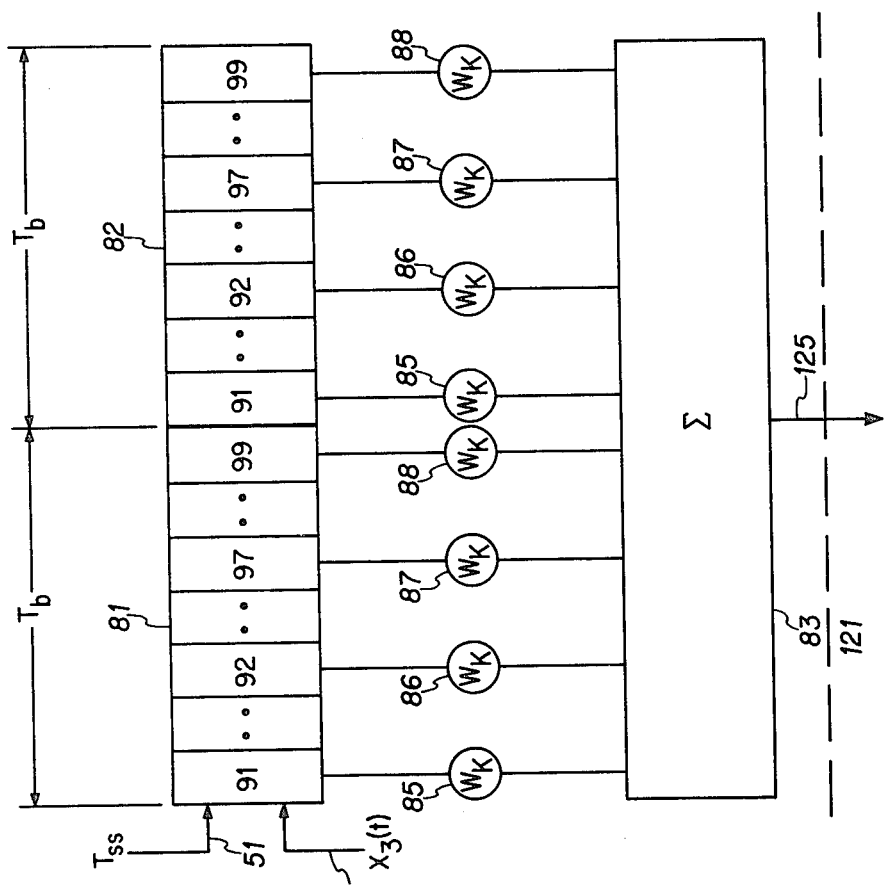
FIG. 12 is an embodiment of the symbol matched filter device of the receiver shown in FIG. 10.

FIG. 12 provides a block diagram of the matched filter devices 121, 122, 123 or 134. The different transfer functions $h_1(2T_B-t)$, $h_2(2T_B-t)$, $h_3(2T_B-t)$ and $h_4(2T_B-t)$ are determined by weighting devices 85, 86, 87 through 88 shown in FIG. 12. The data is conducted from the chip matched filter device 128 into the symbol matched filter devices and, for purposes of explanation, we shall cover device 121, however, devices 122, 123 and 134 are essentially identical with the exception of the selection of the weighting coefficient devices 85, 86, 87 through 88. In any event, the data is conducted and stored into the first storage cell 91 of the charge transfer device 81, and on the occurrence of each clock pulse upon conductor 51, the data stored within storage cell 91 is transferred serially across the charge transfer device. It should be noted that although charge transfer devices 81 or 82 are the only one sampled bit length, that the tapped outputs for these devices need only equal one-half number of chips per symbol. The number of storage cells can be equal to the number of samples taken per chip times the number of chips per symbol or only one, in the coherent cases, storage cell per chip times the number of chips per symbol, being that the primary data to be stored and compared is the sampled correlated peak output of matched filter device 128. By varying of the clock $T_{ss}$, the matched filter device of FIG. 12 may be designed so that only a minimal number of storage cells are required, yet complete correlation can be achieved by the two matched filters 128, 121, 122, 123 or 134 as shown in FIG. 10. Summing device 83 sums the output of the weighted coefficient multipliers and provides the summation on conductor 125 which is then applied to the squaring device 120 as shown in FIG. 10.

THEORY OF OPERATION

In detecting the transmitted signals, similar signal processing operations occurred in the inphase and quadrature phase channels 124 and 130 respectively; therefore, in the following analysis, only the inphase channel 124 of FIG. 10 is considered, and the results are extended to the quadrature phase channel. For an MSK modulated chip code as in FIG. 2, the baseband signal present on conductor 25 of FIG. 10 is expressed as:

$$x_1(t) = \tfrac{1}{2} C_I \cos \pi \frac{R_c t}{2} \cos(\omega_u t + \theta) + \tfrac{1}{2} C_Q \sin \pi \frac{R_c T}{2} \sin(\omega_u t + \theta)$$

where $R_c$ is the chip rate and $C_I, C_Q$, the inphase and quadrature phase codes. The output of the matched filter correlator 128 appears on conductor 33 and can be represented mathematically by the equation $$x_3(\tau) = \frac{T_c}{2} [C_I \cos\theta + C_Q \sin\theta][(1-\alpha)\cos(\pi\alpha) + \frac{1}{\pi}\sin(\pi\alpha)] \text{ where}$$

$$\alpha = \frac{|\tau|}{2T_c} \text{ for } 2T_c < \tau < +2T_c.$$

Making the assumption that the transmitted signal code is followed by the same code, then the tapped delay line output represents the correlation peak, or as is known in the art, the correlation Big Bang and is given for the purposes of explanation for 128 chip length code by $$\left[ \frac{T_c}{2}[(1-\alpha)\cos(\pi\alpha) + \frac{1}{\pi}\sin(\pi\alpha)]\cos\theta \right]\left[ \sum_{i=1}^{L} C_I{}_{129-i} C_I{}_{L+1-i} \right]$$

$L=1, 2, 3, \ldots 128$ $\alpha=0$ at sampled output at $2T_c$, $4T_c$, $6T_c$. For the quadrature channel 130, an expression similar to the above equation is obtained where $C_I$ is replaced by $C_Q$.

The following expressions explain how the circuit detects a data bit one or a zero. From FIG. 10, the four outputs from the matched filter devices as presented on conductors 125 and 127 of the inphase channel 124 and the quadrature phase channel 130 are squared by squaring devices 120a and 120c of each channel then summed by summing devices 175a, 175b and 49. The mathematical expression representative of this implementation can be given by $$(R_1 \cos\theta + R_2 \cos\theta)^2 - (R_1 \cos\theta - R_2 \cos\theta)^2 + (R_1 \sin\theta + R_2 \sin\theta)^2 - (R_1 \sin\theta - R_2 \sin\theta)^2.$$

This, of course, is equal to $4R_1R_2$, likewise the outputs of matched filter devices 122 and 124 are similarly treated so it can be assumed that if $(R_1R_2)<0$, we can assign data equal to 1 and if $R_1R_2>0$, we can assign data equal to 0 where $R_1$ and $R_2$ represent the correlation of the first and second data symbols respectively. The sign of $R_1R_2$ will determine whether a data bit one or zero was transmitted.

Similarly, we can express the summation of the outputs of the multipliers 75, that appear on conductors 47a and 47b and 45a and 45b of FIG. 4, as $2(R_2\cos\theta)(R_1\cos\theta)+2(R_2\sin\theta)(R_1\sin\theta)=2R_1R_2$ and if $R_1R_2<0$, we can arbitrarily assign that data a weight value of one, and if $R_1R_2>0$, we can assign a data value of 0. Of course, the reverse could also be assumed. Thus, either method results in the same detection of differentially phase encoded data and are mathematically identical.

THEORY OF OPERATION OF THE SAMPLING DEVICES 29 AND 31

It is generally desirable to clock the charge coupled devices at the lowest rates possible for the following reasons: (1) fewer cells are required at slower clocking rates; (2) efficiency of transfer of charges is higher for fewer cells; (3) clock drive power requirements reduce with lower clocking rates. It is of interest, therefore, to note the signal-to-noise ratio (SNR) degradation at the output of the sampling devices 29 and 31 due to various sampling rates. An expression of SNR is derived and is given by $$SNR = \frac{\left[\sum_{i=1}^{N} S[(i-.5)T_s]^2 S[\Delta t + (i-.5)T_s]T_s^2\right]}{N_o B T_s^2 \sum_{i=1}^{N} S^2[(1-.5)T_s]}$$

Where $T_s$ is the sampling rate, S(t) is the input signal to the matched filter, i.e., the baseband, N=number of samples per two chip period, $N_o$=noise power density, B=noise bandwidth and $\Delta t$=sampling offset. Table I, which appears below, gives the dB degradation from the ideal $2E/N_o$ due to different sampling rates.

TABLE I

| | | SAMPLING RATE REQUIREMENT DEGRADATION IN SNR | | | | |
|---|---|---|---|---|---|---|
| Sampling Rate $T_s$ | No. of Samples per $2T_c$ $\eta$ | OFFSET SAMPLING $\Delta t + T_s/4$ SNR | dB Degradation | WORST CASE OFFSET SAMPLING $\Delta t = T_s/2$ SNR | dB Degradation | Mean dB Degradation |
| 1.5 $R_c$ | 3 | 1.866 E/$N_o$ | .3 | 1.5 E/$N_o$ | 1.25 | .41 |
| 2 $R_c$ | 4 | 1.924 E/$N_o$ | .10 | 1.707 E/$N_o$ | .688 | .24 |
| 2.5 $R_c$ | 5 | 1.95 E/$N_o$ | .11 | 1.809 E/$N_o$ | .4 | .16 |
| 3 $R_c$ | 6 | 1.965 E/$N_o$ | .077 | 1.86 E/$N_o$ | .315 | .11 |
| 4 $R_c$ | 8 | 1.981 E/$N_o$ | .041 | 1.922 E/$N_o$ | .17 | .06 |

The worst case is when $\Delta t = T_s/2$. Since the baseband bandwidth is 0.75 $R_c$, then 1.5 $R_c$ represents the Nyquist rate, the sampling rate must not be reduced below 1.5 $R_c$. From Table I above, a recommended sampling rate would be 2 $R_c$ with a mean dB degration of 0.24 dB.

EFFECT OF OSCILLATOR INSTABILITY

Due to tuning source 41 instability, the RF reference signal may be off radians/second; this frequency offset will result in a distorted output of the matched filter devices 37 or 39. This output can be calculated as follows:

From the equation of the received signal, the inphase signal is given by $x_1(t) = \frac{1}{2}\cos(R_ct)/2 \cos(\omega_u t + \theta)$. The sampling device 29, 31 or CTD 74 has a transfer function $h_o(t)$ and is expressed as $h_o(t) = \cos(\omega_c t)/4$ for $-T_c < t < T_c$. The matched correlator is obtained by convolving $x_1(t)$ and $h_o(t)$, which is equal to $x_3(t)$ as defined in the discussion above in reference to FIG. 10.

Table II provides the signal to noise ratio (SNR) degradation at the matched filter output which is due to the frequency Doppler shift of the receive signal as detected by the device of FIG. 1. It should be noted that the Doppler shift $\omega_u$ is normalized with respect to the chip rate.

TABLE II

| SNR DEGRADATION AT MATCHED FILTER OUTPUT DUE TO FREQUENCY DOPPLER SHIFT (Doppler/shift $\omega_u$ is normalized with respect to chip rate $\omega_c$ | |
|---|---|
| Normalized Frequency Doppler Shift ($\omega_u/\omega_c$) | SNR Degradation at Matched Filter Output (dB) |
| $.5 \times 10^{-4}$ | 0 |
| $1 \times 10^{-3}$ | .6 |
| $2 \times 10^{-3}$ | 1.9 |
| $3 \times 10^{-3}$ | 4.3 |
| $5 \times 10^{-3}$ | 13 |

Many changes and modifications in the above described embodiments of the invention can, of course, be carried out without department from the scope thereof. Accordingly, the invention is intended to be limited only by the scope of the appended claims.

What is claimed is:

1. An apparatus for detecting differentially phase encoded radio signals, comprising:
    a quadrature downconverter means for downconverting said differentially phase encoded radio signal to a first and second baseband signal in phase quadrature with each other;
    first and second sampling means, each for providing on its output, a stream of pulses representative of an analog signal on its input;
    means for applying said first baseband signal to said first sampling means;
    means for applying said second baseband signal to said second sampling means;
    first and second matched filter means,
    means for connecting said first sampling means to said first matched filter means;
    means for connecting said second sampling means to said second matched filter means;
    timing means for periodically enabling said first and second sampling means and said first and second matched filter means; and
    arithmetic means connected to said first and second matched filter means for subtracting the output of said second matched filter means from said first matched filter means whereby said differentially phase encoded ratio signal is detected.

2. The apparatus according to claim 1 wherein said quadrature downconverting means comprises:
    first and second mixer means;
    means for applying to said first mixer means a first mixing signal;
    means for applying a second mixing signal that is in phase quadrature with said first mixing signal to said second mixer means;

first and second low pass filter means;
means for connecting said first low pass filter means to the output terminal of said first mixer means; and
means for connecting said second low pass filter means to the output terminal of said second mixer means.

3. The apparatus according to claim 2 wherein said means for applying a second mixing signal to said second mixer means comprises:
Hilbert's transform means;
means for connecting said first mixing signal to an input terminal of said Hilbert's transform means; and
means for connecting the output of said Hilbert's transform means to said second mixer means.

4. The apparatus according to claim 1 wherein said quadrature downconverter means comprises:
a first and second mixer means;
a means for applying a mixing signal to said first and second mixer means;
a first and second low pass filter means;
means for connecting said first low pass filter means to said first mixer means;
means for connecting said second low pass filter means to said second mixer means; and
Hilbert's transform means connected in line between said means for applying said radio signal to said quadrature downconverter means and said second mixer means whereby the output of said Hilbert's transform means is in phase quadrature with said differentially phase encoded radio signal.

5. The apparatus according to claim 1 wherein said quadrature downconverter means comprises:
a first and second sample and hold device;
a first and second low pass filter means;
means for connecting said first low pass filter means to said first sample and hold device;
means for connecting said second low pass filter means to said second sample and hold device;
sampling control means for periodically energizing said sample and hold circuit wherein a sample of the signal present on the input of said sample and hold device is sampled and stored and presented on the output of said sample and hold device; and
Hilbert's transform means inserted in line between said means for applying said radio signal to said quadrature downconverter means and said second sample and hold device whereby the output of said Hilbert's transform means is in phase quadrature with said differentially phase encoded radio signal.

6. The apparatus according to claim 1 wherein said quadrature downconverting means comprises:
a first and second sample and hold device;
a first and second low pass filter means;
means for connecting said first low pass filter means to said first sample and hold device;
means for connecting said second low pass filter means to said second sample and hold device;
Hilbert's transform means connected to said second sample and hold device; and
sampling control means connected to said first sample and hold circuit and said Hilbert's transform means whereby said Hilbert's transform means delays the output signal of said sampling control means to correspond to one quarter of a cycle of the carrier frequency of said radio signal and whereby the outputs of said first low pass filter means and said second low pass filter means are baseband signals in phase quadrature with each other.

7. The apparatus according to claim 1 wherein said differentially phase encoded radio signal is a coherent differentially phase encoded radio signal and said first and second matched filter means each comprises:
first matched filter device having an A section and a B section wherein each section stores and sums a first plurality of sample pulses; and
first multiplier means for multiplying the stored and summed output of said section A with the stored and summed output of said section B providing the product therefrom.

8. The apparatus according to claim 1 wherein said differentially phase encoded radio signal is a noncoherent differentially phase encoded radio signal and each of said first matched filter means and said second matched filter means comprises:
a first and second matched filter device each having an A section and a B section;
a first and second multiplier means wherein said first multiplier means is connected to the outputs of said A section and said B section of said first matched filter device and said second multiplier means is connected to said A section and said B section of said second matched filter device whereby said first multiplier means and said second multiplier means each multiplies the stored and summed outputs of said A section with the stored and summed outputs of said B section providing a product therefrom; and
means for connecting the outputs of said first and second matched filter devices to said arithmetic means for obtaining the combination of the products of said first multiplier means and the products of said second multiplier means of said first and second matched filter means.

9. The apparatus according to claim 8 wherein said differentially phase encoded ratio signal is a four phase differentially phase encoded radio signal and wherein said apparatus further comprises:
an inphase arithmetric means for summing the outputs of said first multiplier means of said first matched filter means and said first multiplier means of said second matched filter means whereby the inphase data is decoded therefrom; and
a quadrature arithmetic means for summing the product of said second multiplier means of said first and second matched filter means whereby the quadrature phase data is decoded therefrom.

10. The apparatus according to claims 7 or 8 wherein each of said first and second matched filter devices comprise:
a first charge transfer device having an A section and a B section with each section containing a symbol number of storage cells with each cell having a tapped output and wherein said symbol number is equal to the number of chips per symbol times the sample rate of said first and second sampling means;
a second arithmetic means having an A section and a B section, each section containing a sample symbol number of inputs which are summed and a resulting output obtained;
a plurality of coefficient weighting devices each having a preselected coefficient; and
means for connecting said preselected coefficient weighting devices between the tapped outputs of said charge transfer device and said inputs of said second arithmetic means whereby said connections being in a preselected order such that each of said matched filter devices is matched to a predetermined data symbol.

11. The apparatus of claims 7 or 8 wherein said matched filter device comprises:
 a charge transfer device having an A section and a B section with each section containing at least a sample symbol number of storage cells with each cell having a tapped output and wherein said sample symbol number is equal to the number of chips per symbol times the sample rate of said first and second sample circuit;
 a shift register means having an A section and a B section with each section containing at least a data symbol number of storge cells with each cell having a tapped output and wherein said data symbol number is equal to the number of chips per symbol;
 a chip sequence generator which provides a continuous stream of data chips on its output terminal in a preselected order;
 means for connecting said chip sequence generator to the input of said shift register means;
 first clock source having a rate that corresponds to said sample rate;
 means for connecting sid first clock source to a clock input terminal on said charge transfer device;
 second clock source having a rate that is equal to said first clock rate source divided by the number of samples per chip;
 means for connecting said second clock source to the clock input terminal of said shift register means;
 first arithmetic means for providing the weighted summation of the outputs of said A section of said charge transfer device and said A section of said shift register means;
 means for connecting said tapped outputs of said A section of said charge transfer device and said shift register means to said first arithmetic means;
 second arithmetic means for providing the weighted summation of the outputs of said B section of said charge transfer device and said B section of said shift register means; and
 means for connecting said tapped outputs of said B section of said charge transfer device and said shift register means to said second arithmetic means.

12. The apparatus according to claims 7 or 8 wherein each of said first and second multiplier means comprises:
 a first arithmetic means for obtaining the summation of said A section and said B section of each of said matched filter devices;
 a second arithmetic means for obtaining the summation of said A section and said B section of each of said matched filter devices;
 a first squaring device connected to the output of said first arithmetic means for squaring said output of said first arithmetic means;
 a second squaring device connected to the output of said second arithmetic means for squaring the output of said second arithmetic means; and
 a third arithmetic means for obtaining the difference of the outputs of said first squaring device from the difference of the output of said second squaring device.

13. The apparatus according to claim 1 wherein each of said first matched filter means and said second matched filter means each comprises:
 a chip matched filter device for obtaining the correlation between a first and second chip of said first or second baseband signal;
 means for applying the first baseband signal to the input of the chip matched filter of the first matched filter means;
 means for applying the second baseband signal to the input of the chip matched filter of the second matched filter;
 a first inphase matched filter device matched to the inphase non-phase reversal chip code sequence;
 a first quadrature phase matched filter device matched to the quadrature non-phase reversal chip code sequence;
 a second inphase matched filter device matched to the phase reversal of the inphase chip code sequence;
 a second quadrature matched filter device matched to the phase reversal of the quadrature chip code sequence;
 means for connecting the output of the chip matched filter devices to the inputs of the first inphase matched filter device, the first quadrature phase matched filter device, the second inphase matched filter device, and the second quadrature matched filter device;
 a first, second, third and fourth squaring device;
 means for connecting said first squaring device to the output of said first inphase matched filter device;
 means for connecting said second squaring device to the first quadrature matched filter device;
 means for connecting said third squaring device to the output of said second inphase matched filter device;
 means for connecting said fourth squaring device in the output of said second quadrature matched filter device;
 a first arithmetic means for summing the outputs of said first squaring device of said first and second matched filter means;
 means for connecting said first squaring device of said first and second matched filter means to said first arithmetic means;
 a second arithmetic means for providing a summation of the outputs of said second squaring device of said first and second matched filter means;
 means for connecting said second squaring device of said first and second matched filter means to said second arithmetic means;
 a third arithmetic means for providing a summation of the outputs of said third squaring device of said first and second matched filter means;
 means for connecting said third squaring device of said first and second matched filter means to said third arithmetic means;
 a fourth arithmetic means for providing a summation of the outputs of said fourth squaring device of said first and second matched filter means;
 means for connecting said fourth squaring device of said first and second matched filter means to said fourth arithmetic means;
 a fifth arithmetic means for providing a summation of said first and second arithmetic means;
 means for connecting said fifth arithmetic means to said first and second arithmetic means;

a sixth arithmetic means for providing a summation of the outputs of said third and fourth arithmetic means; and means for connecting said sixth arithmetic means to said third and fourth arithmetic means.

14. The apparatus according to claim 13 wherein said chip matched filter device comprises:

a first charge transfer device having an A section and a B section with each section containing a chip number of storage cells wherein said chip number is equal to the number of sample pulses taken per chip;

a first and second summing device wherein each of said summing devices has a sample chip member of inputs which are summed with a resultant output;

a plurality of coefficient weighting devices, each device having a preselected coefficient; and means for connecting each of said preselected coefficient weighting devices between a preselected output of said charge transfer device and a preselected input of said summing devices whereby each output of said charge transfer device is connected to the summing device by a member of said coefficient weighting devices.

15. The apparatus according to claim 13 wherein each of said first inphase matched filter devices, first quadrature matched filter devices, second inphase matched filter devices and second quadrature matched filter devices comprises:

a charge transfer device having an A section and a B section with each section containing a symbol number of storage cells wherein each symbol number is equal to at least one-half the number of chips per symbol;

a first and second summing device wherein each of said summing devices has a number of inputs which is equal to said symbol number;

a plurality of coefficient weighting devices each having a preselected coefficient; and means for connecting each of said preselected coefficient weighting devices between a preselected output of said charge transfer device and a preselected input of said summing devices whereby each output of said charge transfer device is connected to the input of said summing devices by a member of said coefficient weighting devices.

16. The method of detecting a differentially phase encoded radio signal comprising the steps of:

quadrature downconverting a differentially phase encoded radio signal to a first and second baseband signal in phase quadrature with each other;

sampling said first and second baseband signal at a predetermined rate;

passing said sampled first baseband signal through a first matched filter device;

passing said sampled second baseband signal through a second matched filter device; and combining the correlated output of said first matched filter device and said second matched filter device.

17. The method for detecting a differentially phase encoded ratio signal according to claim 16 wherein the step of passing said sampled baseband signals through said first and second matched filter devices each comprises the further steps of:

storing a first symbol of said baseband signal in a first storage device having a plurality of tapped outputs and storing a second symbol of said first baseband signal in a second storage device having a plurality of tapped outputs;

multiplying each output of said plurality of tapped outputs of said first storage device by a first group of predetermined coefficients obtaining a first plurality of weighted outputs;

multiplying each output of said plurality of tapped outputs of said second storage device by a second group of predetermined coefficients obtaining a second plurality of weighted outputs;

summing said first plurality of weighted outputs;

summing said second plurality of weighted outputs; and multiplying the sum of said first plurality of weighted outputs with the sum of said second plurality of weighted outputs.

18. The method for detecting a differentially phase encoded radio signal according to claim 17 wherein the step of multiplying the sum of said first plurality of weighted outputs with the sum of said second plurality of weighted outputs, comprises:

obtaining a total summation by summing the sum of said first plurality of weighted outputs with the sum of said second plurality of weighted outputs;

obtaining a total difference by substracting from the sum of said first plurality of weighted outputs, the sum of said second plurality of weighted outputs;

squaring said total summation obtaining a squared total summation;

squaring said total difference obtaining a squared total difference; and subtracting from said squared total summation, said squared total difference.

* * * * *